United States Patent
An et al.

(10) Patent No.: US 11,227,393 B2
(45) Date of Patent: Jan. 18, 2022

(54) VIDEO IMAGE SEGMENTATION METHOD AND APPARATUS, STORAGE MEDIUM AND ELECTRONIC DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Shan An, Beijing (CN); Zhaoqi Zhu, Beijing (CN); Yu Chen, Beijing (CN); Zhi Weng, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 39 days.

(21) Appl. No.: 16/757,760

(22) PCT Filed: Sep. 25, 2018

(86) PCT No.: PCT/CN2018/107388
§ 371 (c)(1),
(2) Date: Apr. 20, 2020

(87) PCT Pub. No.: WO2019/080685
PCT Pub. Date: May 2, 2019

(65) Prior Publication Data
US 2020/0320712 A1    Oct. 8, 2020

(30) Foreign Application Priority Data
Oct. 24, 2017    (CN) .......................... 201711003830.X

(51) Int. Cl.
  *G06T 7/11* (2017.01)
  *G06T 7/136* (2017.01)
  *G06N 20/00* (2019.01)

(52) U.S. Cl.
  CPC ................ *G06T 7/11* (2017.01); *G06N 20/00* (2019.01); *G06T 7/136* (2017.01); *G06T 2207/10016* (2013.01); *G06T 2207/20081* (2013.01)

(58) Field of Classification Search
  CPC combination set(s) only.
  See application file for complete search history.

(56) References Cited

U.S. PATENT DOCUMENTS

2015/0065803 A1*  3/2015  Douglas ............. A61B 1/00045
                                                 600/200
2017/0161905 A1*  6/2017  Reyzin .................... G06T 7/194

FOREIGN PATENT DOCUMENTS

CN    102833492 A    12/2012
CN    103325112 A     9/2013
(Continued)

OTHER PUBLICATIONS

Gary R. Bradski, "Motion segmentation and pose recognition with motion history gradients," Aug. 13, 2001, Machine Vision and Applications (2002) 13: ,pp. 174-179.*

(Continued)

*Primary Examiner* — Omar S Ismail
(74) *Attorney, Agent, or Firm* — Qinghong Xu

(57) ABSTRACT

A video image segmentation method includes: obtaining an image segmentation model by performing machine learning based on a historical video image and a mask image of the historical video image; adjusting the image segmentation model based on an initial frame of an image to be segmented, a previous frame of a frame to be segmented and a mask image of the previous image; and performing segmen- (Continued)

tation on the image to be segmented using the image segmentation model after the adjusting.

12 Claims, 6 Drawing Sheets

(56) References Cited

FOREIGN PATENT DOCUMENTS

| CN | 105205834 A | 12/2015 |
|---|---|---|
| CN | 105654508 A | 6/2016 |
| CN | 105741269 A | 7/2016 |
| CN | 106295716 A | 1/2017 |
| CN | 106664417 A | 5/2017 |
| CN | 107248162 A | 10/2017 |
| EP | 3128485 A1 | 2/2017 |
| EP | 3223237 A1 | 9/2017 |

OTHER PUBLICATIONS

Munchurl Kim, "A VOP Generation Tool: Automatic Segmentation of Moving Objects in Image SequencesBased on Spatio-Temporal Information," Mar. 2013, IEEE Transactions on Circuits and Systems for Video Technology, vol. 9, No. 8, pp. 174-179.*

Upal Mahbub, One-Shot-Learning Gesture Recognition Using Motion History Based Gesture Silhouettes, Dec. 1999, 2013 The Institute of Industrial Applications Engineers, Japan., https://www.researchgate.net/publication/259756650, pp. 186-191.*

Paul Voigtlaender, "Online Adaptation of Convolutional Neural Networks for Video Object Segmentation," Jan. 8, 2017, Computer Vision and Pattern Recognition, pp. 1-7.*

"Online Adaptation of Convolutional Neural Networks for Video Object Segmentation".

"One-Shot Video Object Segmentation".

"Research on Key Technologies of Video-Based Human Behavior Recognition".

The ISR dated Dec. 28, 2018 by the WIPO.

\* cited by examiner

VIDEO IMAGE SEGMENTATION METHOD AND APPARATUS, STORAGE MEDIUM AND ELECTRONIC DEVICE

CROSS-REFERENCE TO RELATED APPLICATIONS

This application is a national phase application under 35 U.S.C. § 371 of International Patent Application No. PCT/CN2018/107388, filed on Sep. 25, 2018 which claims priority to Chinese Patent Application No. 201711003830.X, filed on Oct. 24, 2017, the entire contents of both of which are incorporated herein by reference.

TECHNICAL FIELD

The present disclosure relates to the technical field of video image segmentation, and in particular, to a video image segmentation method, a video image segmentation device, a computer-readable storage medium, and an electronic device.

BACKGROUND

With rapidly growth of e-commerce, competition among the major e-commerce platforms is also more and more intense. Therefore, in order to improve competitiveness and provide users with a more comprehensive product information, most of the e-commerce platforms provide users with more comprehensive product information by recording video of commodity and obtaining various orientated views by the method of video segmentation.

It should be noted that the information disclosed in the above background section is only for enhancing the understanding of the background of the present disclosure, and therefore may include information that does not constitute prior art known to those of ordinary skill in the art.

SUMMARY

The present disclosure is directed to provide a video image segmentation method, a video image segmentation device, a computer-readable storage medium, and an electronic device, so as to overcome, to a certain extent, one or more problems caused by limitation and defection of related art.

According to an aspect of the disclosure, there is provided a video image segmentation method, including:

obtaining an image segmentation model by performing machine learning based on a historical video image and a mask image of the historical video image;

adjusting the image segmentation model based on an initial frame of an image to be segmented, a previous frame of a frame to be segmented and a mask image of the previous image; and performing segmentation on the image to be segmented using the image segmentation model after the adjusting.

According to an exemplary embodiment of the disclosure, the adjusting the image segmentation model based on an initial frame of an image to be segmented, a previous frame of a frame to be segmented and a mask image of the previous image includes:

determining whether a number of frames to be segmented of the image to be segmented exceeds a preset threshold; and when the number of frames to be segmented of the image to be segmented does not exceed the preset threshold, adjusting the image segmentation model based on the initial frame of the image to be segmented, the previous frame of the frame to be segmented and the mask image of the previous image.

According to an exemplary embodiment of the disclosure, after the determining whether a number of frames to be segmented of the image to be segmented exceeds a preset threshold, the video image segmentation method further includes:

when the number of frames to be segmented of the image to be segmented exceeds the preset threshold, adjusting the image segmentation model based on the initial frame of the image to be segmented, a preset frame, the previous frame of the frame to be segmented and the mask image of the previous image.

According to an exemplary embodiment of the disclosure, the video image segmentation method further includes:

extracting the preset frame from the image to be segmented.

According to an exemplary embodiment of the disclosure, the extracting the preset frame from the image to be segmented includes:

obtaining an extraction frame number through multiplying the number of frames to be segmented by a preset value; and extracting a frame corresponding to the extraction frame number as the preset frame.

According to an exemplary embodiment of the disclosure, the preset value is a value ranged 0.6-0.9.

According to an aspect of the disclosure, there is provided a video image segmentation apparatus, including:

a machine learning module, configured to obtain an image segmentation model by performing machine learning based on a historical video image and a mask image of the historical video image;

a model adjusting module, configured to adjust the image segmentation model based on an initial frame of an image to be segmented, a previous frame of a frame to be segmented and a mask image of the previous image; and an image segmenting module, configured to perform segmentation on the image to be segmented using the image segmentation model after the adjusting.

According to an exemplary embodiment of the disclosure, the adjusting the image segmentation model based on an initial frame of an image to be segmented, a previous frame of a frame to be segmented and a mask image of the previous image includes:

determining whether a number of frames to be segmented of the image to be segmented exceeds a preset threshold; and when the number of frames to be segmented of the image to be segmented does not exceed the preset threshold, adjusting the image segmentation model based on the initial frame of the image to be segmented, the previous frame of the frame to be segmented and the mask image of the previous image.

According to an exemplary embodiment of the disclosure, after the determining whether a number of frames to be segmented of the image to be segmented exceeds a preset threshold, the video image segmentation apparatus further includes:

when the number of frames to be segmented of the image to be segmented exceeds the preset threshold, adjusting the image segmentation model based on the initial frame of the image to be segmented, a preset frame, the previous frame of the frame to be segmented and the mask image of the previous image.

According to an exemplary embodiment of the disclosure, the video image segmentation apparatus further includes:

an extracting module, configured to extract the preset frame from the image to be segmented.

According to an exemplary embodiment of the disclosure, the extracting the preset frame from the image to be segmented includes:

obtaining an extraction frame number through multiplying the number of frames to be segmented by a preset value; and extracting a frame corresponding to the extraction frame number as the preset frame.

According to an exemplary embodiment of the disclosure, the preset value is a value ranged 0.6-0.9.

According to an aspect of the disclosure, there is provided a computer-readable storage medium, having stored thereon a computer program, wherein the computer program, when being executed by a processor, implements the video image segmentation method according to any one of forgoing embodiments.

According to an aspect of the disclosure, there is provided an electronic device, including:

a processor; and a memory for storing instructions executable by the processor;

wherein, the processor is configured to implement, by executing the instructions, the video image segmentation method according to any one of forgoing embodiments.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with this disclosure, and are used together with the specification to explain the principles of this disclosure. Obviously, the drawings in the following description are only some embodiments of the present disclosure. For those of ordinary skill in the art, without paying any creative work, other drawings can also be obtained based on these drawings.

DETAILED DESCRIPTION

Figure 1:
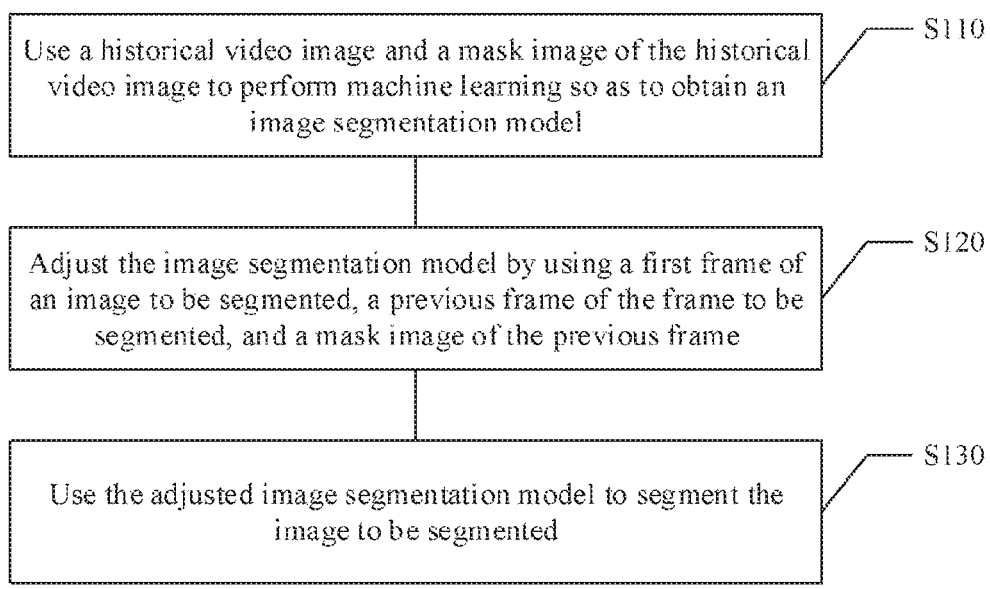
FIG. 1 schematically illustrates a flow chart of a video image segmentation method.

Exemplary embodiments will now be described more fully with reference to the accompanying drawings. However, the exemplary embodiments can be implemented in various forms and should not be construed as limited to the embodiments set forth herein. Instead, these embodiments are provided so that the disclosure will be thorough and complete, and will fully convey the concept of exemplary embodiments to those skilled in the art. The described features, structures, or characteristics may be combined in any suitable manner in one or more embodiments. In the following description, many specific details are provided to give a full understanding of the embodiments of the present disclosure. However, those skilled in the art will realize that the technical solutions of the present disclosure may be practiced without one or more of the specific details, or by using other methods, components, materials, devices, steps and the like. In other cases, well-known technical solutions are not shown or described in detail to avoid obscuring aspects of the present disclosure.

In addition, the drawings are merely schematic illustrations of the present disclosure and are not necessarily drawn to scale. The same reference numerals in the drawings identify the same or similar parts, and thus repeated descriptions thereof will be omitted. Some of the block diagrams shown in the drawings indicate functional entities and do not necessarily have to correspond to physically or logically independent entities. These functional entities may be implemented in the form of software, or implemented in one or more hardware modules or integrated circuits, or implemented in different networks and/or processor devices and/ or microcontroller devices.

Video object segmentation, referred to as the VOS, generally requires extraction of frames from the video frame by frame and segmentation of intra-frame object. Conventional video image segmentation solution may include the following two methods.

One of them is referred to as one-shot video object segmentation (OSVOS) method, in which fine adjustment is made to a trained model based on the first image frame of the video to be segmented and, then, image segmentation results of subsequent frames are generated using the adjusted model. However, since only the learned parameters of the first frame are used to fine-tune the model, it is impossible to predict large changes in the subsequent frames, resulting in the splitting of segmentation for those subsequent frames.

The other one is referred to as on-line adaptive video object segmentation (OnAVOS) method, in which the 0-th frame and a result generated for the previous frame are used to fine-tune the mode that has been trained, serving as a reference for the generation of the next frame. Compared to the segmentation method using only the first frame as a reference, the segmentation effect can be improved using this method. However, for those changes such as object occlusion and object rotation, the segmentation result of previous frame is unable to help conducting the generation of segmentation result for the next frame, resulting in deteriorated segmentation result.

An example of the OnAVOS method may include the following steps. Firstly, a segmentation model is established and, then, trained based on video frames and corresponding mask images. Thereafter, when video segmentation is performed, using the 0-th frame as a guide frame, the network is fine-tuned based on the 0-th frame. During the generation process of subsequent frames, an on-line adaptive manner is adopted, which uses the 0-th frame and a result generated for a previous frame to fine-tune the network, to guide generation of the next frame.

However, according to the above-mentioned video object segmentation method, only the 0-th frame and the previous frame of the generated frame serve as basis for fine-tuning the network parameters, two adjacent frames of the multi-frame video may have a great correlation, but the difference between the subsequent frame and the 0-th frame may be too large. Therefore, when occlusion exists at the segmented object in the frame, it may be unable to segment the occluded object desirably in the subsequent few frames based on only the adjacent frame and the 0-th frame.

According to an exemplary embodiment, there is provided a video image segmentation method. Referring to FIG. 1, the video image segmentation method may include the following steps.

In step S110, an image segmentation model is obtained by performing machine learning based on a historical video image and a mask image of the historical video image.

In step S120, the image segmentation model is adjusted based on an initial frame of an image to be segmented, a previous frame of a frame to be segmented and a mask image of the previous image.

In step S130, segmentation is performed on the image to be segmented using the image segmentation model after the adjusting.

According to the above-described video image segmentation method, on the one hand, the image segmentation model is adjusted based on the initial frame of the image to be segmented, the previous frame of the frame to be segmented and the mask image of the previous image, and the segmentation is performed on multiple frames in the image to be segmented using the image segmentation model after the adjusting, thereby solving the problem of related art where only the 0-th frame and the previous frame of the generated frame serve as basis of adjustment, two adjacent frames of the multi-frame video may have a great correlation, but the difference between the subsequent frame and the 0-th frame may be too large and, accordingly, when occlusion exists at the segmented object in the frame, it may be unable to segment the occluded object desirably in the subsequent few frames. Moreover, the segmentation quality of the image can be improved so that the user can view a clearer image, thereby enhancing the user experience. On the other hand, the image segmentation model is adjusted based on the initial frame of the image to be segmented, the previous frame of the frame to be segmented and the mask image of the previous image, and the segmentation is performed on multiple frames in the image to be segmented using the image segmentation model after the adjusting, thereby solving the splitting problem in segmentation of subsequent frames caused by failure to predict large changes for the subsequent frames, when the image segmentation model is adjusted only based on the first frame of the image to be segmented. Therefore, the quality of segmented image can be further improved.

In the following, each step in the above-mentioned video image segmentation method according to the exemplary embodiment will be explained and described in detail.

As to step S110, in which an image segmentation model is obtained by performing machine learning based on a historical video image and a mask image of the historical video image, details may be given as follows.

Figure 2:
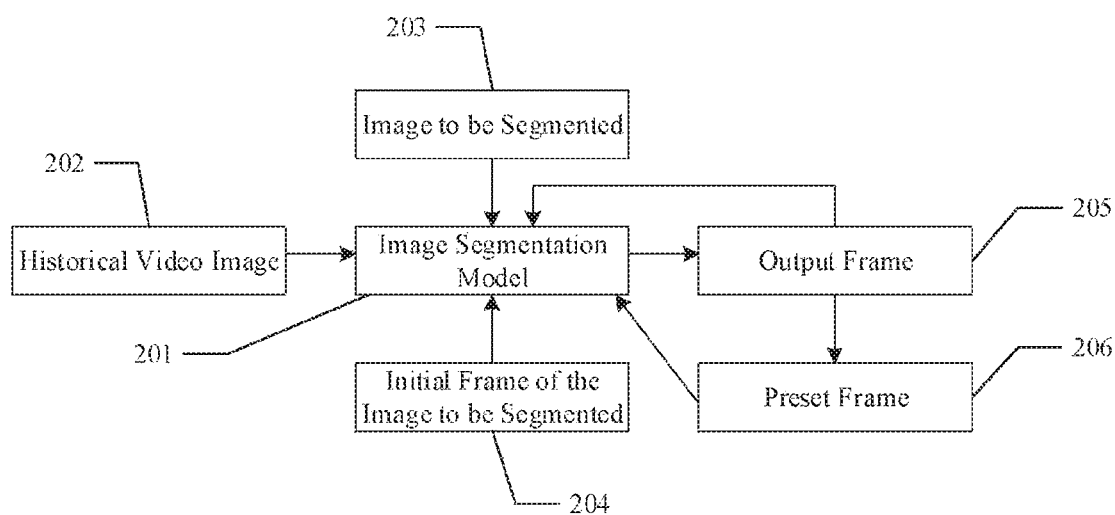
FIG. 2 schematically illustrates a flow block diagram of a video image segmentation method.

Referring to FIG. 2, an image segmentation model 201 is obtained by performing machine learning (training) based on a historical video image 202 and a mask image of the historical video image. Optionally, an original video frame and an object segmentation mask, which is manually marked, may be used as data for training the segmentation model. Network weights used for segmentation may be obtained through network training and, then, may be used for predicting large change in subsequent frames, thereby avoiding the splitting problem in segmentation of the subsequent frames. It should be noted that, as to the network used for training, a VGGNet (a convolutional neural network model) and a residual network may be used as the basic structure of the network, which may include 38 hidden layers and may use Imagenet as the pre-training data of the network, so as to obtain rich feature parameters of the object.

Figure 3:
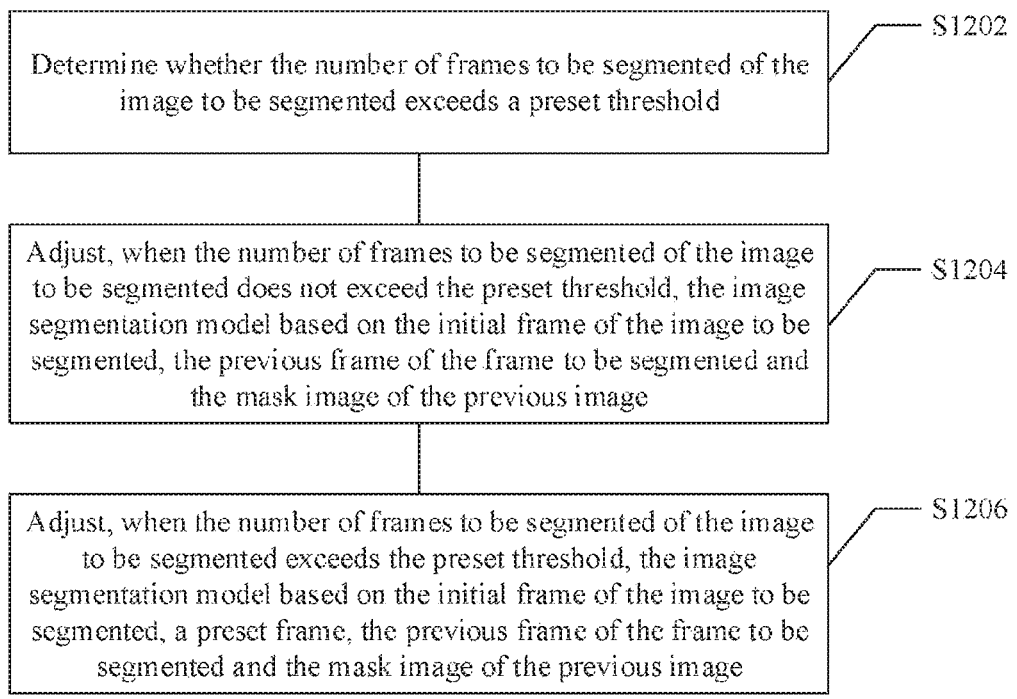
FIG. 3 schematically illustrates a flow chart of adjusting an image segmentation model.

As to step S120, in which the image segmentation model is adjusted based on an initial frame of an image to be segmented, a previous frame of a frame to be segmented and a mask image of the previous image, referring to FIG. 3, the adjustment of the image segmentation model includes steps S1202-S1206.

In step S1202, it is determined whether the number of frames to be segmented of the image to be segmented exceeds a preset threshold.

For example, firstly, the number of frames to be segmented of the image to be segmented is calculated and, then, it is determined whether the number of frames to be segmented of the image to be segmented exceeds the preset threshold. In an embodiment, the preset threshold may be 10 or 20, or other values, such as 25, 30, 40 and the like, which is not limited in the embodiment.

In step S1204, when the number of frames to be segmented of the image to be segmented does not exceed the preset threshold, the image segmentation model is adjusted based on the initial frame of the image to be segmented, the previous frame of the frame to be segmented and the mask image of the previous image.

For example, when the number of frames to be segmented of the image to be segmented does not exceed the preset threshold (e.g., less than or equal to 10 frames), it can be determined that the number of frames to be segmented of the image to be segmented does not exceed the preset threshold, and the image segmentation model can be directly adjusted by using the initial frame of the image to be segmented, the previous frame of the frame to be segmented and the mask image of the previous image. It should be noted that, in order to use the initial frame of the image to be segmented to adjust the image segmentation model, the initial frame of the image to be segmented can be extracted. For example, the initial frame of the image to be segmented may be extracted manually, or may be extracted through other processing software, which is not particularly limited by the present example.

In step S1206, when the number of frames to be segmented of the image to be segmented exceeds the preset threshold, the image segmentation model is adjusted based on the initial frame of the image to be segmented, a preset frame, the previous frame of the frame to be segmented and the mask image of the previous image.

For example, referring to FIG. 2, when the number of frames to be segmented of the image 203 to be segmented exceeds the preset threshold (e.g., greater than 10 frames), it can be determined that the number of frames to be segmented of the image to be segmented exceeds the preset threshold, and the image segmentation model 201 should be adjusted by using the initial frame image 204 of the image to be segmented, the preset frame image 206, the previous frame (output frame) 205 of the frame to be segmented and the mask image of the previous image. Since the preset frame image is introduced to adjust the image segmentation model, the basic features of the object can be remained while it can be further ensured that a moving object in the video, which may appear again after being occluded, can be segmented desirably, thereby avoiding deviation of the object features and further improving the accuracy of image segmentation.

Optionally, the above-described video image segmentation method may further include: extracting the preset frame from the image to be segmented. In an embodiment, the extraction of the preset frame image may include: obtaining an extraction frame number through multiplying the number of frames to be segmented by a preset value; and extracting a frame corresponding to the extraction frame number as the preset frame.

For example, the extraction frame number is firstly obtained through multiplying the number of frames to be segmented by a preset value and, then, a frame corresponding to the extraction frame number is extracted as the preset frame image. In an embodiment, the preset value may be any value ranged 0.6-0.9. Examples are given as follows.

Assuming the number of frames in the video is n, when $10<n\leq15$, the image segmentation model is fine-tuned by further using image information of the 10-th frame as a learning frame, on the basis of the initial frame of the image to be segmented, the previous frame of the frame to be segmented and the mask image of the previous image, so as to avoid feature deviation of the object being occluded in the video.

When $15<n\leq20$, the image segmentation model is fine-tuned by further using image information of the 15-th frame, on the basis of the initial frame of the image to be segmented, the previous frame of the frame to be segmented and the mask image of the previous image, so as to avoid feature deviation of the object being occluded in the video.

When $20<n\leq25$, the image segmentation model is fine-tuned by further using image information of the 20-th frame, on the basis of the initial frame of the image to be segmented, the previous frame of the frame to be segmented and the mask image of the previous image, so as to avoid feature deviation of the object being occluded in the video.

When $25<n\leq30$, the image segmentation model is fine-tuned by further using image information of the 25-th frame, on the basis of the initial frame of the image to be segmented, the previous frame of the frame to be segmented and the mask image of the previous image, so as to avoid feature deviation of the object being occluded in the video.

As to step S130, in which segmentation is performed on the image to be segmented using the image segmentation model after the adjusting, details thereof may be given as follows.

Referring to FIG. 2, when the number of frames to be segmented of the image to be segmented is less than the preset threshold, the image segmentation model is adjusted based on the initial frame of the image to be segmented, the previous frame of the frame to be segmented and the mask image of the previous image and, then, used to perform segmentation on the image to be segmented; and, when the number of frames to be segmented of the image to be segmented is greater than the preset threshold, the image segmentation model is adjusted based on the initial frame of the image to be segmented, the preset frame, the previous frame of the frame to be segmented and the mask image of the previous image and, then, used to perform segmentation on the image to be segmented.

Figure 4:
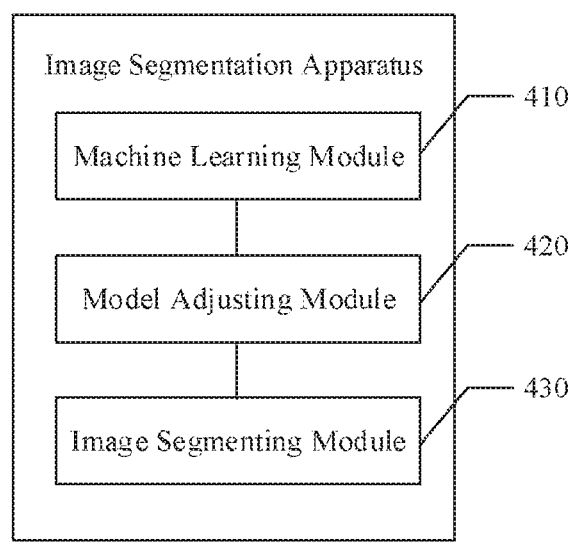
FIG. 4 schematically illustrates a block diagram of a video image segmentation apparatus.

A video image segmentation apparatus is also provided by the disclosure. Referring to FIG. 4, the image segmentation apparatus includes a machine learning module 410, a model adjusting module 420 and an image segmenting module 430.

The machine learning module 410 may be configured to obtain an image segmentation model by performing machine learning based on a historical video image and a mask image of the historical video image.

The model adjusting module 420 may be configured to adjust the image segmentation model based on an initial frame of an image to be segmented, a previous frame of a frame to be segmented and a mask image of the previous image.

The image segmenting module 430 may be configured to perform segmentation on the image to be segmented using the image segmentation model after the adjusting.

According to an exemplary embodiment of the disclosure, the adjusting the image segmentation model based on an initial frame of an image to be segmented, a previous frame of a frame to be segmented and a mask image of the previous image includes:

determining whether the number of frames to be segmented of the image to be segmented exceeds a preset threshold; and when the number of frames to be segmented of the image to be segmented does not exceed the preset threshold, adjusting the image segmentation model based on the initial frame of the image to be segmented, the previous frame of the frame to be segmented and the mask image of the previous image.

According to an exemplary embodiment of the disclosure, after the determining whether the number of frames to be segmented of the image to be segmented exceeds a preset threshold, the video image segmentation apparatus further includes:

when the number of frames to be segmented of the image to be segmented exceeds the preset threshold, adjusting the image segmentation model based on the initial frame of the image to be segmented, a preset frame, the previous frame of the frame to be segmented and the mask image of the previous image.

According to an exemplary embodiment of the disclosure, the video image segmentation apparatus further includes:

an extracting module, configured to extract the preset frame from the image to be segmented.

According to an exemplary embodiment of the disclosure, the extracting the preset frame from the image to be segmented includes:

obtaining an extraction frame number through multiplying the number of frames to be segmented by a preset value; and extracting a frame corresponding to the extraction frame number as the preset frame.

According to an exemplary embodiment of the disclosure, the preset value is a value ranged 0.6-0.9.

The specific details of each module in the above-mentioned video image segmentation apparatus have been described in detail in the corresponding video image segmentation method, so they will not be repeated here.

It should be noted that although several modules or units of the device for action execution are mentioned in the above detailed description, this division is not mandatory. In fact, according to the embodiments of the present disclosure, the features and functions of the two or more modules or units described above may be embodied in one module or unit. Also, the features and functions of one module or unit described above can be further divided into multiple modules or units to be embodied.

In addition, although the various steps of the method in the present disclosure are described in a specific order in the drawings, this does not require or imply that the steps must be performed in the specific order, or all the steps shown must be performed to achieve the desired result. Additionally or alternatively, some steps may be omitted, multiple steps may be combined into one step for execution, and/or one step may be decomposed into multiple steps for execution, and so on.

Through the description of the above embodiments, those skilled in the art can easily understand that the example embodiments described herein can be implemented by software, or can be implemented by software in combination with necessary hardware. Therefore, the technical solution according to the embodiments of the present disclosure may be embodied in the form of a software product, which may be stored in a non-transitory storage medium (e.g., CD-ROM, U disk, mobile hard disk, etc.) or on a network, and may include several instructions to cause a computing device (e.g., personal computer, server, mobile terminal, or network device, etc.) to perform the method according to the embodiments of the present disclosure.

In an exemplary embodiment of the present disclosure, an electronic device capable of implementing the above method is also provided.

Those skilled in the art can understand that various aspects of the present disclosure can be implemented as a system, a method, or program product. Therefore, various aspects of the present disclosure may be specifically implemented in the form of: a complete hardware implementation, a complete software implementation (including firmware, microcode, etc.), or a combination of hardware and software implementations, which may be collectively referred to herein as "circuit", "module" or "system".

The electronic device 600 according to this embodiment of the present disclosure will be described below with reference to FIG. 5. The electronic device 600 shown in FIG. 5 is only an example, and should not imply any limitation to the functions and usage scope of the embodiments of the present disclosure.

Figure 5:
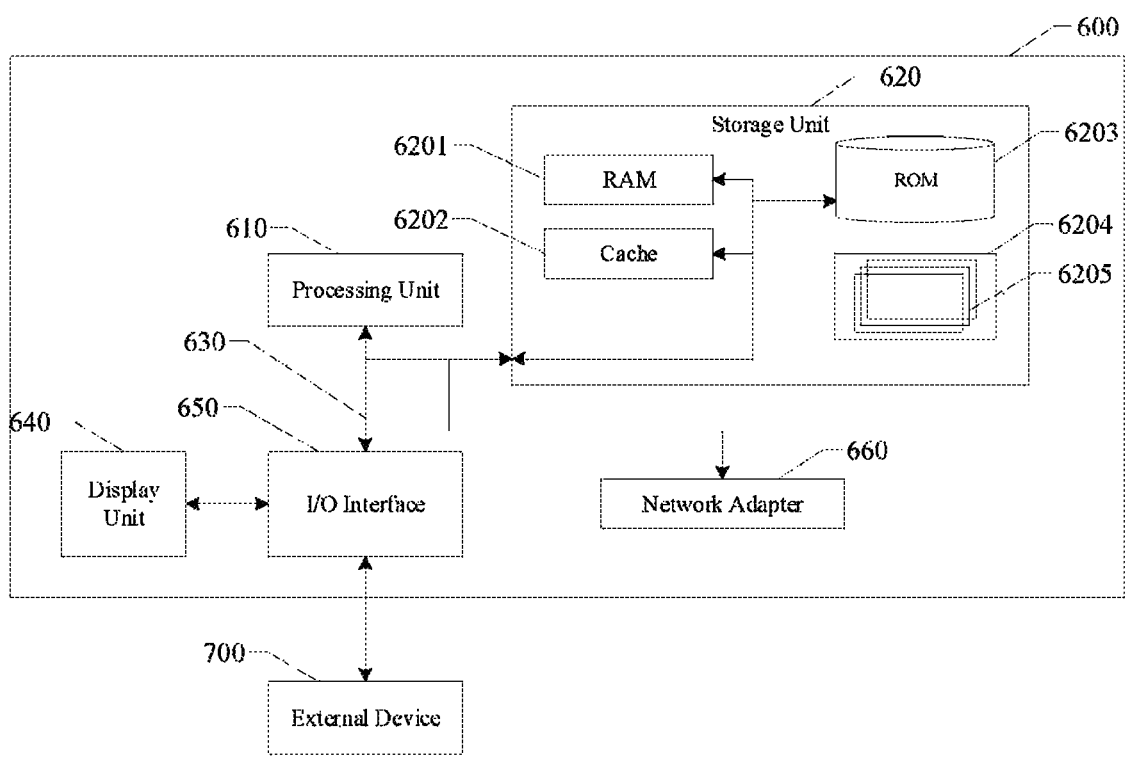
FIG. 5 schematically illustrates an example of an electronic device for implementing the above-mentioned video image segmentation method.

As shown in FIG. 5, the electronic device 600 is represented in the form of a general-purpose computing device. The components of the electronic device 600 may include, but are not limited to: at least one processing unit 610, at least one storage unit 620, and a bus 630 connecting different system components (including the storage unit 620 and the processing unit 610).

In an embodiment, the storage unit stores program codes which, when being executed by the processing unit 610, causes the processing unit 610 to implement steps of various exemplary embodiments described in the forgoing "detailed description" part of the specification. For example, the processing unit 610 may be configured to perform, as shown in FIG. 1, step S110, obtaining an image segmentation model by performing machine learning based on a historical video image and a mask image of the historical video image; step S120, adjusting the image segmentation model based on an initial frame of an image to be segmented, a previous frame of a frame to be segmented and a mask image of the previous image; and step S130, performing segmentation on the image to be segmented using the image segmentation model after the adjusting.

The storage unit 620 may include a readable medium in the form of a transitory storage unit, such as a random access storage unit (RAM) 6201 and/or a high-speed cache storage unit 6202, and may further include a read-only storage unit (ROM) 6203.

The storage unit 620 may further include a program/utility tool 6204 having a set of (at least one) program module 6205. Such program module 6205 includes, but not limited to, an operating system, one or more application programs, other program modules, and program data. Each of these examples or some combination thereof may include an implementation of network environment.

The bus 630 may be one or more of several types of bus structures, including a storage unit bus or a storage unit controller, a peripheral bus, a graphics acceleration port, a processing unit, or a local area using any of a variety of bus structures bus.

The electronic device 600 may also communicate with one or more external devices 700 (e.g., keyboard, pointing device, Bluetooth device, etc.), and may also communicate with one or more devices that enable a user to interact with the electronic device 600, and/or any device (e.g., router, modem, etc.) that enables the electronic device 600 to communicate with one or more other computing devices. This communication can be performed through an input/output (I/O) interface 650. Moreover, the electronic device 600 can also communicate with one or more networks (e.g., local area network (LAN), a wide area network (WAN), and/or a public network such as the Internet) through a network adapter 660. As shown in the drawing, the network adapter 660 communicates with other modules of the electronic device 600 through the bus 630. It should be understood that, although not shown in the drawing, other hardware and/or software modules may be used in conjunction with the electronic device 600, including but not limited to, microcode, device driver, redundant processing unit, external disk drive array, RAID system, tape driver and data backup storage system.

Through the description of the above embodiments, those skilled in the art can easily understand that the example embodiments described herein can be implemented by software, or can be implemented by software in combination with necessary hardware. Therefore, the technical solution according to the embodiments of the present disclosure may be embodied in the form of a software product, which may be stored in a non-transitory storage medium (e.g., CD-ROM, U disk, mobile hard disk, etc.) or on a network, and may include several instructions to cause a computing device (e.g., personal computer, server, mobile terminal, or network device, etc.) to perform the method according to the embodiments of the present disclosure.

In an exemplary embodiment of the present disclosure, there is also provided a computer-readable storage medium on which a program product capable of implementing the above method of the disclosure is stored. In some possible implementation manners, various aspects of the present disclosure may also be implemented in the form of a program product, including program code which, when being executed by a terminal device, causes the terminal device to implement steps of various exemplary embodiments described in the forgoing "detailed description" part of the specification.

Figure 6:
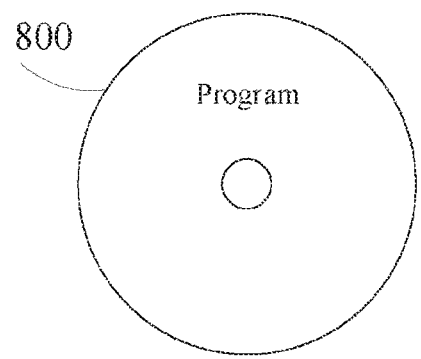
FIG. 6 schematically illustrates a computer-readable storage medium for implementing the above-mentioned video image segmentation method.

Referring to FIG. 6, a program product 800 for implementing the above method according to an embodiment of the present disclosure is described. It may be implemented using a portable compact disk read-only memory (CD-ROM) and include a program code, and may be executed by a terminal device, for example, a personal computer. However, the program product of the present disclosure is not limited thereto. In the disclosure, the readable storage medium may be any tangible medium containing or storing a program, which may be used by or in combination with an instruction execution system, apparatus, or device.

The program product may employ any combination of one or more readable medium. The readable medium may be a readable signal medium or a readable storage medium. The readable storage medium may be, for example but not limited to, an electrical, magnetic, optical, electromagnetic, infrared, or semiconductor system, apparatus, or device, or any combination thereof. More specific examples of readable storage medium (non-exhaustive list) may include: electrical connections with one or more wires, portable disks, hard disks, random access memory (RAM), read only memory (ROM), erasable programmable read-only memory (EPROM or flash memory), optical fiber, portable compact disk read-only memory (CD-ROM), optical storage device, magnetic storage device, or any suitable combination of the foregoing.

The computer-readable signal medium may include a data signal that is transmitted in baseband or as part of a carrier wave, in which readable program code is carried. This transmitted data signal can take many forms, including but not limited to electromagnetic signals, optical signals, or any suitable combination of the above. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, including but not limited to wireless, wired, optical fiber cable, RF, etc., or any suitable combination of the foregoing.

The program code for performing the operations of the present disclosure may be written in any combination of one or more programming languages, which may include an object oriented programming language, such as the Java and C++, or may include conventional formula programming language, such as "C" language or similar programming language. The program code may be entirely executed on the user computing device, partly executed on the user device, executed as an independent software package, partly executed on the user computing device and partly executed on a remote computing device, or entirely executed on the remote computing device or server. In situations involving a remote computing device, the remote computing device may be connected to the user computing device through any kind of network, including a local area network (LAN) or a wide area network (WAN), or may be connected to an external computing device (e.g., through connection via the Internet using Internet service provider).

In addition, the above-mentioned drawings are only schematic illustrations of processes included in the method according to the exemplary embodiment of the present invention, and are not intended to limit the purpose. It is easy to understand that the processes shown in the above drawings do not indicate or limit the chronological order of these processes. In addition, it is also easy to understand that these processes may be performed, for example, synchronously or asynchronously in multiple modules.

Those skilled in the art will readily contemplate other embodiments of the present disclosure taking into consideration the specification and practicing the invention disclosed herein. The present application is intended to cover any variations, uses, or adaptations of this disclosure that conform to the general principles of this disclosure and include the common general knowledge or conventional technical means in the technical field not disclosed by this disclosure. The specification and examples are intended to be considered as exemplary only, and the protection scope and spirit of the disclosure are indicated by the following claims.

What is claimed is:

1. A video image segmentation method, comprising: obtaining an image segmentation model by performing machine learning based on a historical video image and a mask image of the historical video image; adjusting the image segmentation model based on an initial frame of an image to be segmented, a previous frame of a frame to be segmented and a mask image of the previous image; and performing segmentation on the image to be segmented using the image segmentation model after the adjusting, wherein the adjusting the image segmentation model based on an initial frame of an image to be segmented, a previous frame of a frame to be segmented and a mask image of the previous image comprises: determining whether a number of frames to be segmented of the image to be segmented exceeds a preset threshold; when the number of frames to be segmented of the image to be segmented does not exceed the preset threshold, adjusting the image segmentation model based on the initial frame of the image to be segmented, the previous frame of the frame to be segmented and the mask image of the previous image; and when the number of frames to be segmented of the image to be segmented exceeds the preset threshold, adjusting the image segmentation model based on the initial frame of the image to be segmented, a preset frame, the previous frame of the frame to be segmented and the mask image of the previous image.

2. The video image segmentation method according to claim 1, further comprising: extracting the preset frame from the image to be segmented.

3. The video image segmentation method according to claim 2, wherein the extracting the preset frame from the image to be segmented comprises: obtaining an extraction frame number through multiplying the number of frames to be segmented by a preset value; and extracting a frame corresponding to the extraction frame number as the preset frame.

4. The video image segmentation method according to claim 3, wherein the preset value is a value ranged 0.6-0.9.

5. A non-transitory computer-readable storage medium, having stored thereon a computer program, wherein the computer program, when being executed by a processor, implements a video image segmentation method comprising: obtaining an image segmentation model by performing machine learning based on a historical video image and a mask image of the historical video image; adjusting the image segmentation model based on an initial frame of an image to be segmented, a previous frame of a frame to be segmented and a mask image of the previous image; and performing segmentation on the image to be segmented using the image segmentation model after the adjusting, wherein the adjusting the image segmentation model based on an initial frame of an image to be segmented, a previous frame of a frame to be segmented and a mask image of the previous image comprises: determining whether a number of frames to be segmented of the image to be segmented exceeds a preset threshold; when the number of frames to be segmented of the image to be segmented does not exceed the preset threshold, adjusting the image segmentation model based on the initial frame of the image to be segmented, the previous frame of the frame to be segmented and the mask image of the previous image; and when the number of frames to be segmented of the image to be segmented exceeds the preset threshold, adjusting the image segmentation model based on the initial frame of the image to be segmented, a preset frame, the previous frame of the frame to be segmented and the mask image of the previous image.

6. An electronic device, comprising: a processor; and a memory for storing instructions executable by the processor; wherein, the processor is configured to implement, by executing the instructions, a video image segmentation method according to claim 1 comprising: obtaining an image segmentation model by performing machine learning based on a historical video image and a mask image of the historical video image; adjusting the image segmentation model based on an initial frame of an image to be segmented, a previous frame of a frame to be segmented and a mask image of the previous image; and performing segmentation on the image to be segmented using the image segmentation model after the adjusting, wherein the adjusting the image segmentation model based on an initial frame of an image to be segmented, a previous frame of a frame to be segmented and a mask image of the previous image comprises: determining whether a number of frames to be segmented of the image to be segmented exceeds a preset threshold; when the number of frames to be segmented of the image to be segmented does not exceed the preset threshold, adjusting the image segmentation model based on the initial frame of the image to be segmented, the previous frame of the frame to be segmented and the mask image of the previous image; and when the number of frames to be segmented of the image to be segmented exceeds the preset threshold, adjusting the image segmentation model based on the initial frame of the image to be segmented, a preset frame, the previous frame of the frame to be segmented and the mask image of the previous image.

7. The non-transitory computer-readable storage medium according to claim 5, wherein the video image segmentation method further comprises: extracting the preset frame from the image to be segmented.

8. The non-transitory computer-readable storage medium according to claim 7, wherein the extracting the preset frame from the image to be segmented comprises: obtaining an extraction frame number through multiplying the number of frames to be segmented by a preset value; and extracting a frame corresponding to the extraction frame number as the preset frame.

9. The non-transitory computer-readable storage medium according to claim 8, wherein the preset value is a value ranged 0.6-0.9.

10. The electronic device according to claim 6, wherein the video image segmentation method further comprises: extracting the preset frame from the image to be segmented.

11. The electronic device according to claim 10, wherein the extracting the preset frame from the image to be segmented comprises: obtaining an extraction frame number through multiplying the number of frames to be segmented by a preset value; and extracting a frame corresponding to the extraction frame number as the preset frame.

12. The electronic device according to claim 11, wherein the preset value is a value ranged 0.6-0.9.

* * * * *